DIRECTION FINDER

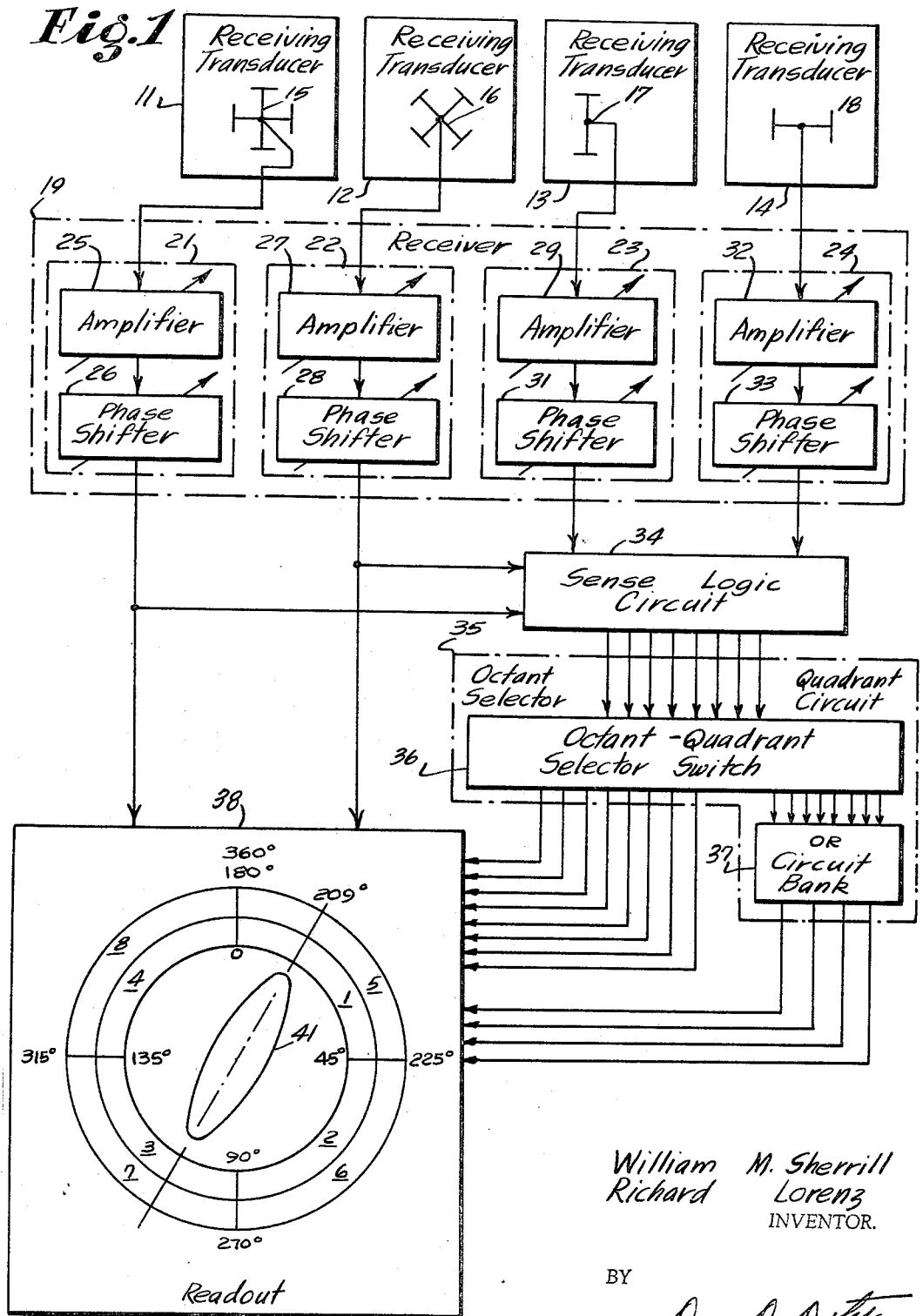

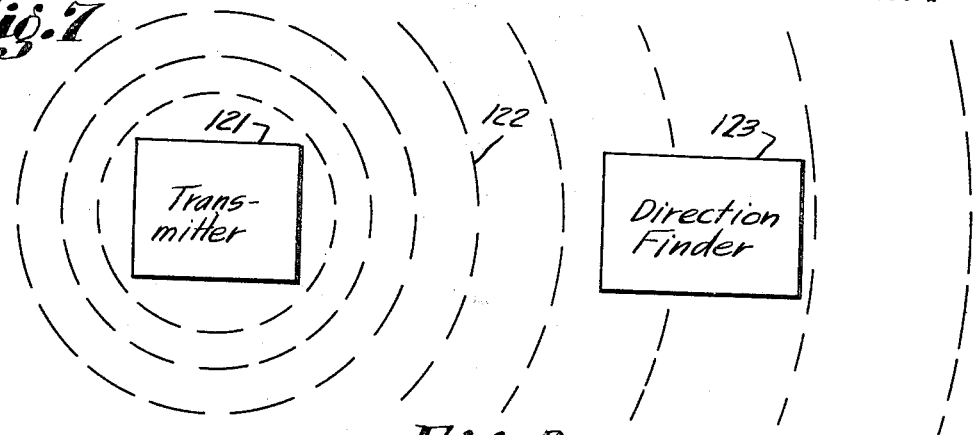
Fig. 1
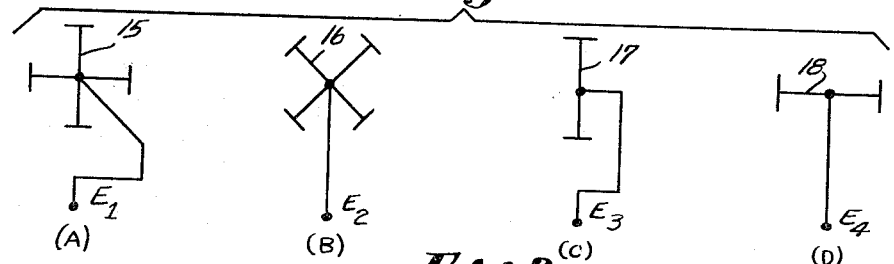
Fig. 2
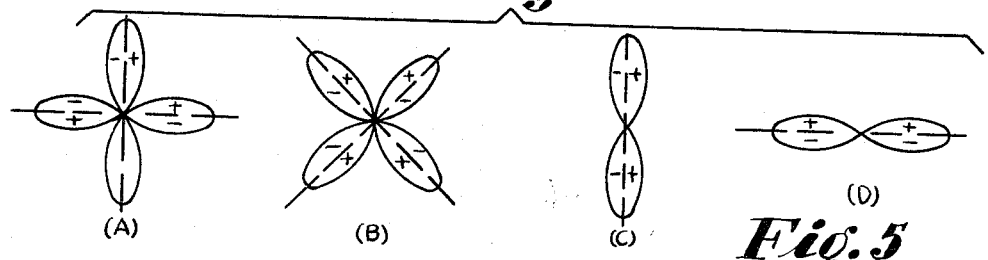
Fig. 3
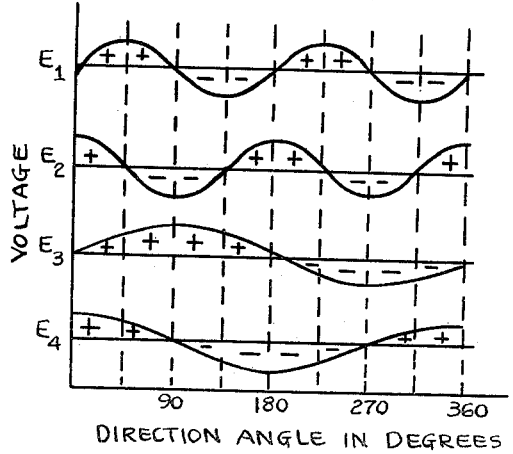
Fig. 4
Fig. 5
| OCTANT | 1 | 2 | 3 | 4 | 5 | 6 | 7 | 8 |
|---|---|---|---|---|---|---|---|---|
| $E_1$ | + | + | + | + | + | + | + | + |
| $E_2$ | + | − | + | − | + | − | + | − |
| $E_3$ | + | + | − | − | − | − | + | + |
| $E_4$ | + | + | + | + | − | − | − | − |
| QUADRANT | I | | II | | III | | IV | |
William M. Sherrill
Richard Lorenz
INVENTORS Jan. 13, 1970     W. M. SHERRILL ET AL     3,490,024

Filed Sept. 30, 1968     3 Sheets-Sheet 3

Fig. 6

William M. Sherrill
Richard Lorenz
INVENTORS

BY

Don D. Doty
Attorney

United States Patent Office 3,490,024
Patented Jan. 13, 1970

3,490,024
DIRECTION FINDER
William M. Sherrill and Richard Lorenz, San Antonio,
Tex., assignors, by mesne assignments, to the United
States of America as represented by the Secretary of
the Navy
Filed Sept. 30, 1968, Ser. No. 763,863
Int. Cl. G01s 5/02
U.S. Cl. 343—113                                  11 Claims

ABSTRACT OF THE DISCLOSURE

A radiant energy source direction finder having a plurality of receiving transducers for producing a like plurality of phase-related signals which are respectively proportional to a selected, calibrated relative bearing of said radiant energy source, an analog-to-digital circuit for converting said plurality of phase related signals into polarized binary signals corresponding thereto, a digital resolver network for converting said polarized binary signals into signals representative of a corresponding octant sector of a predetermined compass indicator, a switching circuit for converting said octant sector signals into a quadrant sector signal, and a readout for displaying the selected octant or quadrant sectors and the compass reading of the relative bearing of the aforesaid radiant energy source.

---

The invention described herein may be manufactured and used by or for the Government of the United States of America for governmental purposes without the payment of any royalties thereon or therefor.

The present invention relates generally to signal direction finding systems, and, in particular, it is a passive radio direction finder which digitally resolves the relative bearing ambiguities of a radio energy source.

Heretofore, direction finders have been employed to determine the direction of a radiating source. For instance, it is well known to use phase comparison techniques, wherein a plurality of spatially disposed antennas are used to receive signals, the reception times or phases of which are measured and relatively compared in associated receiving apparatus. The phase differences of said received signals are, of course, indicative of the relative bearing of the source thereof.

For many practical purposes, the prior art direction finders are quite satisfactoy; however, in those cases where considerable accuracy is important, they often leave a great deal to be desired. For example, the direction finders of the prior art typically indicate ambiguous bearings of received radiant energy that must be resolved by means of a sequenced sense procedure, the sequenced procedure of which may become long and complicated, depending on the number of bearing ambiguities to be resolved.

The instant invention overcomes most of the disadvantages of the aforementioned prior art, in that it determines the bearing of a radiating source substantially instantaneously without ambiguities over a wide range of bearings.

It is, therefore, an object of this invention to provide an improved signal source direction finder.

Another object of this invention is to provide an improved digital direction finder which operates over a wide range of bearing angles.

Still another object of this invention is to provide a digtal direction finder which optimizes the resolution of signal source bearing ambiguities.

A further object of this invention is to provide a method and means for determining and selectively indicating the bearing of a predetermined signal source within either an octant sector or a quadrant sector of a readout display, as well as indicating the bearing thereof more precisely therewithin.

A further object of this invention is to provide an improved method and means for digitally determining and indicating the bearing of a predetermined radio signal source.

Another object of this invention is to provide an improved method and means for digitally resolving and substantially eliminating the bearing ambiguities of radio and other predetermined signal source direction finders over a predetermined three hundred and sixty degree azimuth circle and for selectively indicating precisely the bearing thereof within the appropriate octant or quadrant of said three hundred and sixty degree azimuth circle.

Other objects and many of the attendant advantage will be readily appreciated as the subject invention becomes better understood by reference to the following detailed description, when considered in conjunction with the accompanying drawings wherein:

FIG. 1 is a functional block diagram of the direction finding system constituting this invention;

FIG. 2 illustrates in schematic detail the various antennas that may be incorporated as the receiving transducers in the system of FIG. 1;

FIG. 3 depicts typical response patterns of the antennas of FIG. 2, respectively;

FIG. 4 is a graphical illustration of the output voltages and relative phases of the respective antennas of FIG. 2 plotted against the direction angle of the incoming signal received thereby;

FIG. 5 depicts a logic table showing the polarized Boolean expressions obtained as a result of processing voltages $E_1$ through $E_4$ of FIG. 4 with respect to voltage $E_1$ taken at zero degrees time phase within the analog to digital converter portion of the sense logic circuit of the system of FIG. 1;

FIG. 6 is a detailed schematic diagram of the sector logic circuit, the octant-quadrant selector circuit, and the readout sector circuits of the device of FIG. 1; and FIG. 7 is a quasi-pictorial plan view of the manner in which the subject invention operates.

It would appear to be noteworthy at this time that the particular preferred embodiment of the instant invention which has been particularly portrayed and discussed herewith is that of an electromagnetic energy or radio signal source direction finder. However, it should be understood that such embodiment has been disclosed in order to keep the disclosure of the invention as simple as possible. Therefore, it should also be understood that the invention is intended to be construed and claimed in its broadest practical and legal aspects which, of course, would allow it to acquire such design structures and characteristics as would facilitate its being used as a direction finder of a source of any known type radiant energy. Hence, with the proper design changes being applied thereto, it could, for example, be constructed as a passive acoustical energy source direction finder which would be operable as a Sonar system under water or as an acoustical system in any suitable atmospheric environment; or it could, for instance, be constructed to be receptive to infrared or other radiant energy and, thus, be operable as a direction finder in space or other places, as circumstances dictate. In any event, it would obviously be well within the purview of one skilled in the art having the benefit of the teachings presented herewith to make such design changes as would be necessary to make the invention function in any appropriate environmental medium and make it responsive to any known type of radiant energy.

Referring now to FIG. 1, there is shown a plurality of receiving transducers 11 through 14 which are adapted to receive and be responsive to the energy being sensed for bearing determining purposes. Because, as previously mentioned, the presently disclosed embodiment of the subject invention is disclosed as being a radio direction finder, receiving transducers 11 through 14 are, in fact, a plurality of antennas 15 through 18, respectively. Said antennas and their individual response patterns will be discussed more fully subsequently in conjunction with FIGS. 2 and 3, but suffice to say at this time, that they produce the output data signals $E_1$, $E_2$, $E_3$, and $E_4$, which are further processed by the remainder of the circuitry of the invention to produce unambiguous relative bearing information at the readout thereof.

The outputs of said antennas 15 through 18 are coupled to suitable inputs of a receiver 19; and in this particular case, they are coupled to the inputs of a like plurality of channels 21 through 24, respectively.

Said channels may include any conventional receiving elements or apparatus that is necessary to optimize the data processing effected thereby, but at least, should preferably include a series-connected variable amplifier and variable phase shifter. Hence, in actual practice, the output of antenna 15 may be connected to the input of a variable amplifier 25, the output of which is connected to the input of a variable phase shifter 26—both of which are included in the aforementioned channel 21. Also, the output of antenna 16 is connected to the input of a variable amplifier 27, the output of which is connected to the input of a variable phase shifter 28—both of which are included in the aforesaid channel 22. In addition, the output of antenna 17 is connected to the input of a variable amplifier 29, the output of which is connected to the input of a variable phase shifter 31—both of which are included in channel 23. Likewise, the output of antenna 18 is connected to the input of a variable amplifier 32, the output of which is connected to the input of a variable phase shifter 33—both of which are included in the aforesaid channel 24.

The outputs of phase shifters 26, 28, 31, and 33 are, in fact, the calibrated outputs of receiver 19, and they supply voltages $E_1$, $E_2$, $E_3$, and $E_4$ to a sense logic circuit 34 because they are connected to a like number of inputs thereof, respectively.

As will be more fully discussed in conjunction with FIG. 6, there are eight outputs from sense logic circuit 34, each of which timely produces an output signal representing a particular octant or 45° compass sector which, in turn, represents a particular compass bearing angle of the source of received radio signal. For convenience of disclosure, it is assumed herein that the following 45° compass bearing sectors are respectively represented by said eight outputs, when reading left to right from sense logic circuit 34 of FIG. 1: 0°–45°, 45°–90°, 90°–135°, 135°–180°, 180°–225°, 225°–270°, 270°–315°, and 315°–360°. They are all, of course, connected to compatible inputs of an octant-quadrant selector circuit 35 which, in actual practice, comprise, among other things, a like number of inputs of an octant-quadrant selector switch 36 incorporated therein.

The outputs of switch 36 consist of the aforesaid eight octant signals and eight additional outputs which are connected to the inputs of and further processed by a bank of OR circuits 37 to represent four azimuth quadrants, each of which include two adjacent ones of the aforesaid octants. Thus, for the sake of simplicity of disclosure, the left hand octet of outputs of selector circuit 35 are considered to produce the aforementioned 45° azimuth sector signals, while the right hand quartet of outputs are considered to produce signals representing predetermined 90° azimuth sectors. In the latter case, reading again from left to right at the output of octant-quadrant selector circuit 35, the outputs therefrom represent the following compass sectors, respectively: 0°–90°, 90°–180°, 180°–270°, and 270°–360°.

These twelve outputs from selector circuit 35 are connected to suitable inputs of a readout 38 and specifically to the various octant and quadrant sector displays thereof. Although not shown in detail because it is of conventional structure, readout 38 has overlapping octant sectors 1 through 8 of known directional disposition. Likewise, the quadrant sectors 1–5, 2–6, 3–7, and 4–8 have known directional dispositions, too. Each thereof will be discussed again briefly in conjunction with the operation of the device of FIG. 1, which discloses individual operational features thereof.

The aforementioned sector indicators are physically disposed around the face of a cathode ray tube 39, which also receives its X and Y inputs (representing ordinant and abscissa signals) as a result of being respectively connected to the outputs of the aforementioned channels 21 and 22 of receiver 19. From such signals, lissajous or other patterns—such as representative pattern 41—are formed which display the arcuate bearing of the radio signal source in addition to the selected octant or quadrant direction from which it is coming, thereby preventing any ambiguous indication thereof.

FIGS. 2(a), (b), (c), and (d) symbolically depict the structural configurations and dispositions of antennas 15 through 18 of FIG. 1, respectively.

FIGS. 2(a) and (b) show crossed double loop directional antennas which have response patterns or characteristics similar to those depicted in FIGS. 3(a) and (b), due to their respective physical dispositions and geometrical configurations. Their response patterns show that there is either 0° or 180° phase shift between the antenna voltages, and they are, therefore, denoted by $+$ and $-$ in the patterns of FIGS. 3(a) and (b).

FIGS. 3(c) and (d) show simple loop antennas which have response patterns or characteristics similar to those depicted in FIGS. 3(c) and (d), likewise due to their respective physical dispositions and geometrical configurations. Their response patterns also disclose that there is either 0° or 180° phase shift between the antenna voltages, and they, too, are denoted by $+$ and $-$ in the patterns of FIGS. 3(c) and (d).

The absolute phase of each of antennas 15 through 18 for an azimuth angle rotation of 360° of a transmitting antenna is illustrated by representative waveforms of the output voltages $E_1$ through $E_4$ in the graphical representation of FIG. 4, and a summary of the relative phases therebetween with respect to $E_1$ taken at zero time is tabulated for further clarity in the table of FIG. 5. Both FIGS. 4 and 5 will be further discussed below during the discussion of the operation of the subject invention.

Referring now to FIG. 6, there is shown a functional diagram of sense logic circuit 34 of FIG. 1. In this particular embodiment, the $E_1$ through $E_4$ voltages from receiver 19 are respectively applied to inputs of a binary analog-to-digital converter circuit 40 by means of input terminals 41 through 44. Each of said input terminals are respectively connected to the input of a like number of Schmitt triggers 45 through 48, with the outputs thereof connected to the inputs of a digital resolver network 49. The outputs of Schmitt triggers 45 through 48 are also respectively connected to the inputs of a like number of inverters 51 through 54, the outputs of which are likewise connected to appropriate inputs of the aforesaid digital resolver network 49.

Digital resolver network 49 includes sixteen NAND gates, indicated respectively by reference numerals 56 through 71. Each of said NAND gates contains four inputs and an output, and for purposes defining said inputs in a simplified manner, they will be referred to herein as inputs 1, 2, 3, and 4, reading from top to bottom, as they are shown in FIG. 6.

In order to further define the outputs of the aforementioned digital converter circuit 40, they have herein been defined as $E_1$ for the voltage output of Schmitt trigger 45, $\overline{E_1}$ for the output voltage from inverter 51, $E_2$ for the output voltage of Schmitt trigger 46, $\overline{E_2}$ for the output of inverter 52, $E_3$ for the output of Schmitt trigger 47, $\overline{E_3}$ for the output of inverter 53, $E_4$ for the output of Schmitt trigger 48, and $\overline{E_4}$ for the output of inverter 54. It may readily be seen from FIG. 6 that the network of the aforesaid digital resolver network includes the following connections: The $E_1$ output of Schmitt trigger 45 is connected to the number 1 input of NAND gates 56, 58, 61, 63, 64, 66, 69, and 71, and the $\overline{E_1}$ output of inverter 51 is connected to the number 1 input of NAND gates 57, 59, 60, 62, 65, 67, 68, and 70. The $E_2$ output from Schmitt trigger 46 is connected to the number 2 inputs of NAND gates 56, 59, 61, 62, 64, 67, 69, and 70, and the $\overline{E_2}$ output of inverter 52 is connected to the number 2 input of NAND gates 57, 58, 60, 63, 65, 66, 68, and 71. The $E_3$ output of Schmitt trigger 47 is connected to the number 3 inputs of NAND gates 56, 58, 60, 62, 65, 67, 69, and 71, and the $\overline{E_3}$ output of inverter 53 is connected to the number 3 inputs of NAND gates 57, 59, 61, 63, 64, 68, and 70. The $E_4$ of Schmitt trigger 48 is connected to the number 4 inputs of NAND gates 56, 58, 61, 63, 65, 67, 68, and 70, and the $\overline{E_4}$ output of inverter 54 is connected to the number 4 inputs of NAND gates 57, 59, 60, 62, 64, 66, 69, and 71.

The outputs of NAND gates 56 through 71 are connected to the appropriate inputs of a bank of OR circuits 72. In actuality, the outputs of NAND gates 56 and 57 are respectively connected to the pair of inputs of OR gate 81, the outputs of NAND gates 58 and 59 are respectively connected to the inputs of an OR circuit 82, the outputs of NAND gates 60 and 61 are respectively connected to a pair of inputs of an OR gate 83, the outputs of NAND gates 62 and 63 are respectively connected to a pair of inputs of an OR gate 84, the outputs of NAND gates 64 and 65 are respectively connected to a pair of inputs of an OR circuit 85, the outputs of NAND gates 66 and 67 are respectively connected to the inputs of an OR circuit 86, the outputs of NAND gates 67 and 70 are respectively connected to a pair of inputs of an OR circuit 87, and the outputs of NAND gates 70 and 71 are respectively connected to a pair of inputs of OR circuit 88.

The outputs of OR circuits 81 through 88 constitute the outputs of digital resolver network 49 and are respectively connected to the movable arms of a plurality of single throw-double pole switches 91 through 98, the movable arms of which are ganged together in such manner as will allow them to be manually switched simultaneously. The upper contacts of said switches 91 through 98 are connected through a like plurality of indicator lamps 101 through 108 of octant display sectors 109 of the aforementioned readout 37 to a predetermined positive direct current voltage. The lower contacts of switches 91 and 92 are connected to a pair of inputs of an OR circuit 111, the lower contacts of switches 93 and 94 are connected to a pair of inputs of an OR circuit 112, the lower contacts of switches 95 and 96 are connected to a pair of inputs of an OR circuit 113, and the lower contacts of switches 97 and 98 are connected to a pair of inputs of an OR circuit 114. The outputs of OR circuits 111 through 114 constitute the quadrant outputs of the aforementioned octant-quadrant selector circuit 35, and they are respectively connected through a plurality of indicator lamps 115 through 118 (which are physically disposed within the display quadrants 119 of the aforementioned readout 38) to the aforesaid positive direct current voltage.

At this time it would perhaps be desirable to understand that the aforementioned NAND gates 56 through 71 are actually used in digital resolver network 49 because the indicator lamps of all of the octant and quadrant sectors have one terminal thereof connected to a positive direct current voltage. Hence, the outputs from octant-quadrant selector circuit 35 must be either a lesser positive direct current voltage than the aforementioned positive direct current voltage or a ground. Using NAND gates, of course, supply said latter mentioned lesser positive voltages to the other terminals of all of the octant and quadrant sector indicator lamps. However, in the event it is desired that the right hand terminals (as they are depicted in FIG. 6) of all of said indicator lamps are connected to ground, the aforementioned NAND gates 56 through 71 may be replaced by comparable AND gates.

It should also be understood that, with the exception of the instant direction finder, indicated as direction finder 123 in FIG. 7 of the drawing, all of the individual elements disclosed herewith are well known and conventional per se and are, thus, commercially available. Therefore, it is actually their unique arrangements, interconnections and interactions which cause the new and useful combination to be effected which constitutes the subject invention.

The operation of the invention will now be discussed in conjunction with all of the figures of the drawing.

In the event a transmitter 121, such as that represented in FIG. 7, is broadcasting electromagnetic energy 122 throughout a given area, the subject direction finder 123 will undoubtedly receive it, if in range thereof. And if it is desired to know from which direction said energy is being broadcast, the subject direction finder 123 will digitally process the received signals in such manner as to determine and indicate the relative bearing thereof.

In this particular preferred embodiment, referenced quadrants and octants have been employed in readout 37 in order to provide a somewhat coarse or a relative fine indication of the general direction of the incoming radiant energy. When either of these indicators is employed in conjunction with the phase related inputs of the X and Y axis of cathode ray tube 39, substantially all ambiguities are resolved and, thus, there is no question as to whether the signal source is located at some particular compass direction, at 180° thereto, or any other direction for that matter.

To effect such readout, the broadcast radio signals are timely received by antennas 15 through 18 which are physically located at such positions and physically disposed in such configurations as to make the outputs thereof conform to the mathematical expressions:

$E_1 = \sin 2\delta$ for antenna 15,
$E_2 = \cos 2\delta$ for antenna 16,
$E_3 = \sin \delta$ for antenna 17,
$E_4 = \cos \delta$ for antenna 18, where $\delta$ represents the relative bearing angle of the radio energy source in degrees and $E_1$ through $E_4$ represents the output voltages from said antennas, respectively.

After amplification to useful levels by amplifiers 21 through 24 and after adjusting the phases thereof in phase shifters 26 through 33—in order to calibrate the phases of each of receiver channels 21 through 24 to compensate for signal processing errors caused by possible structural differences in the individual circuit components therein—voltages $E_1$ through $E_4$ are processed by Schmitt triggers 41 through 44 and inverters 51 through 54 of analog to digital converter circuit 40 to effectively provide polarized binary + or − (or 1 or 0, if preferred) logic for 180° phase representations of $E_1$, $\overline{E_1}$, $E_2$, $\overline{E_2}$, $E_3$, $\overline{E_3}$, $E_4$, and $\overline{E_4}$ which occur at the output thereof. In order to facilitate interpreting the exemplary relative phase + or − logic used in this particular explanation of the invention, a summary thereof is presented in FIG. 5. From the tabulations shown therein, it should be self-evident how said conversions are effected for the octant and quadrant sectors, respectively. Because NAND gates 56 through 71 are properly interconnected with the aforesaid Schmitt triggers and logical inverters to be responsive to said relative phase representations, and since OR circuits 81 through 88 are suitably coupled to appropriate pairs of the aforesaid NAND gates, the logic functions for octant sense is produced. Such octant sense is thus provided by means of data processing in accordance with the following Boolean expression:

| Octant | Boolean expression | Sector |
|---|---|---|
| 1 | $(E_1 \cdot E_2 \cdot E_3 \cdot E_4) + (\bar{E}_1 \cdot \bar{E}_2 \cdot \bar{E}_3 \cdot \bar{E}_4)$ | A |
| 2 | $(E_1 \cdot E_2 \cdot \bar{E}_3 \cdot E_4) + (\bar{E}_1 \cdot \bar{E}_2 \cdot E_3 \cdot \bar{E}_4)$ | B |
| 3 | $(E_1 \cdot \bar{E}_2 \cdot \bar{E}_3 \cdot E_4) + (\bar{E}_1 \cdot E_2 \cdot E_3 \cdot \bar{E}_4)$ | C |
| 4 | $(E_1 \cdot \bar{E}_2 \cdot \bar{E}_3 \cdot \bar{E}_4) + (\bar{E}_1 \cdot E_2 \cdot E_3 \cdot E_4)$ | D |
| 5 | $(\bar{E}_1 \cdot \bar{E}_2 \cdot \bar{E}_3 \cdot \bar{E}_4) + (E_1 \cdot E_2 \cdot E_3 \cdot E_4)$ | E |
| 6 | $(\bar{E}_1 \cdot \bar{E}_2 \cdot E_3 \cdot \bar{E}_4) + (E_1 \cdot E_2 \cdot \bar{E}_3 \cdot E_4)$ | F |
| 7 | $(\bar{E}_1 \cdot E_2 \cdot E_3 \cdot \bar{E}_4) + (E_1 \cdot \bar{E}_2 \cdot \bar{E}_3 \cdot E_4)$ | G |
| 8 | $(\bar{E}_1 \cdot E_2 \cdot E_3 \cdot E_4) + (E_1 \cdot \bar{E}_2 \cdot \bar{E}_3 \cdot \bar{E}_4)$ | H | where $A = 0°–45°$, $B = 45°–90°$, $C = 90°–135°$, $D = 135°–180°$, $E = 180°–225°$, $F = 225°–270°$, $G = 270°–315°$, and $H = 315°–360°$.

The quadrant sense is, in turn, obtained by applying an OR function by means of OR gates 111 through 114 to the two octant outputs corresponding to the appropriate quadrant desired. This is accomplished in actual practice, of course, by manually setting selector switches 91 through 98 to provide either the octant or quadrant senses, as desired.

When applied to readout 38 of FIG. 1, the aforementioned octant and quadrant signals cause the respective display octant and quadrant sectors to become illuminated, thereby providing an unambiguous bearing readout. Although the alidade of readout 38 is, in this particular instance, double valued, it may obviously be single valued and include any appropriate and properly referenced structure that facilitates the monitoring thereof.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

We claim:

1. A direction finder for determining the relative bearing of a source of incoming radiant energy, comprising in combination:
    means responsive to the radiant energy received from said radiant energy source for producing a plurality of analog signals, the respective phases of which are proportional to the relative bearing thereof;
    means connected to the outputs of said radiant energy responsive means for converting said analog signals into a like plurality of binary digital signals having relative phases proportional thereto, respectively;
    means connected to the outputs of said analog to digital converting means for resolving said binary digital signals into a first signal representing the octant sector of an azimuth circle encompassing the relative bearing of said incoming radiant energy;
    means connected to the outputs of said resolving means for selectively converting said first signal into a second signal representing the quadrant of an azimuth circle encompassing said octant sector and the aforesaid relative bearing of said incoming radiant energy; and
    means connected to the outputs of said selectively converting means for reading out said first or second signals as either the aforesaid octant or quadrant sector.

2. The device of claim 1 wherein said means responsive to the radiant energy received from said radiant energy source for producing a plurality of analog signals, the respective phases of which are proportional to the relative bearing thereof, comprise a quartet of antennas, each of which has predetermined directional energy response characteristics.

3. The device of claim 1 wherein said means responsive to the radiant energy received from said radiant energy source for producing a plurality of analog signals, the respective phases of which are proportional to the relative bearing thereof, comprises:
    a first crossed spaced loop directional antenna disposed in a predetermined vertical plane for producing a first output signal in response to said received radiant energy;
    a second crossed spaced loop directional antenna disposed in the plane of said first crossed spaced loop antenna but rotated forty-five degrees with respect thereto for producing a second output signal in response to said received radiant energy;
    a first single loop directional antenna disposed in the vertical plane of said first and second crossed spaced loop antennas for producing a third output signal in response to said received radiant energy; and
    a second single loop directional antenna disposed in the vertical plane of said first and second crossed spaced loop antennas and said first single loop antenna but located ninety degrees with respect to said first single looped directional antenna for producing a fourth output signal in response to the aforesaid received radiant energy.

4. The device of claim 1 wherein said means responsive to the radiant energy received from said radiant energy source for producing a plurality of analog signals, the respective phases of which are proportional to the relative bearing thereof, comprises a quartet of electroacoustical transducers, each of which has predetermined directional acoustical responsive characteristics.

5. The device of claim 1 wherein said means connected to the outputs of said radiant energy responsive means for converting said analog signals into a like plurality of binary digital signals having relative phases proportional thereto, respectively, comprises:
    a plurality of Schmitt triggers respectively connected to the outputs of said radiant energy responsive means; and
    a like plurality of logical inverters respectively connected to the outputs of said plurality of Schmitt triggers.

6. The device of claim 1 wherein said means connected to the outputs of said analog to digital converting means for resolving said binary digital signals into a first signal representing the octant sector of an azimuth circle encompassing the relative bearing of said incoming radiant energy comprises:
    a plurality of NAND gates respectively connected to the outputs of the aforesaid plurality of Schmitt triggers and logical inverters; and
    a plurality of OR circuits respectively connected to the outputs of predetermined pairs of the aforesaid NAND gates.

7. The device of claim 1 wherein said means connected to the outputs of said resolving means for selectively converting said first signal into a second signal representing the quadrant of an azimuth circle encompassing said octant sector and the aforesaid relative bearing of said incoming radiant energy comprises:
    a plurality of switches, each of which has a movable arm and a pair of contacts adapted for being selectively contacted by said movable arm, with the movable arms thereof respectively connected to the outputs of said resolving means; and
    a plurality of OR circuits each of which has a pair of inputs and an output, with the inputs thereof respectively connected to predetermined contacts of predetermined pairs of the aforementioned plurality of selector switches.

8. The device of claim 1 wherein said means connected to the outputs of said selectively converting means for reading out said first and second signals as either the aforesaid octant or quadrant sector comprises:
    a positive direct current voltage;

a first plurality of lamps respectively connected between the other electrical contacts of each of said plurality of selector switches and said positive direct current voltage; and another plurality of lamps respectively connected between the outputs of said plurality of OR circuits and said positive direct current voltage.

9. The invention of claim 1 further characterized by a plurality of variable phase shifters respectively connected between tthe outputs of said radiant energy responsive means and the inputs of said analog to digital converting means.

10. A method of determining the relative bearing of a source of incoming radiant energy, comprising the steps of:

in response thereto, converting said incoming radiant energy into a first quartet of phase related signal voltages $E_1$, $E_2$, $E_3$, and $E_4$, defined mathematically by the expressions $E_1 = \sin 2\delta$, $E_2 = \cos 2\delta$, $E_3 = \sin \delta$, $E_4 = \cos \delta$, respectively, where said $\delta$ is the relative bearing angle of said incoming radiant energy in degrees;

generating in response to said first quartet of phase related signal voltages a second quartet of phase related signal voltages that are the respective logical inversions thereof;

resolving said first and second quartets of voltages into an octet of voltages representing consecutive forty-five degree azimuth sectors of a predetermined three hundred and sixty degree compass circle, respectively;

generating in response to predetermined pairs of said octet of voltages a third quartet of voltages respectively representing consecutive ninety degree azimuth sectors of said predetermined three hundred and sixty degree compass circle which encompass predetermined adjacent ones of the aforesaid forty-five degree azimuth sectors; and selectively reading out either of said octet of voltages or said third quartet of voltages as said consecutive forty-five or ninety degree azimuth sectors of said three hundred and sixty degree compass circle, respectively.

11. The method of claim 10 further characterized by the step of reading out the aforesaid $E_1$ and $E_2$ signal voltages of said first quartet of phase related voltages in terms of relative bearing of said incoming radiant energy simultaneously with and contiguously with the corresponding selected readout of the aforesaid forty-five or ninety degree azimuth sectors of said three hundred and sixty degree compass circle.

References Cited

UNITED STATES PATENTS

| | | | |
|---|---|---|---|
| 3,344,430 | 9/1967 | Hildebrand | 343—113 X |
| 3,383,690 | 5/1968 | Keller | 343—113 |

RODNEY D. BENNETT, JR., Primary Examiner

R. E. BERGER, Assistant Examiner